United States Patent
Van Cleave et al.

(10) Patent No.: US 11,568,419 B1
(45) Date of Patent: Jan. 31, 2023

(54) COMPUTER-BASED SYSTEM FOR DETERMINING DYNAMIC FINANCIAL TRANSACTION PARAMETERS

(71) Applicant: Wells Fargo Bank, N.A., San Francisco, CA (US)

(72) Inventors: Shari Van Cleave, San Francisco, CA (US); Darren Michael Goetz, Salinas, CA (US); Dennis Emmanuel Montenegro, Concord, CA (US); Dominik Vltavsky, Belmont, CA (US); Fairy Bui, Berkeley, CA (US); Jason Huang, San Francisco, CA (US); Christopher Sipanya, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/125,478

(22) Filed: Dec. 17, 2020

(51) Int. Cl.
 *G06Q 20/40* (2012.01)
 *G06Q 20/10* (2012.01)
 (Continued)

(52) U.S. Cl.
 CPC ............ *G06Q 20/405* (2013.01); *G01S 19/01* (2013.01); *G06Q 20/1085* (2013.01);
 (Continued)

(58) Field of Classification Search
 CPC ............ G06Q 20/405; G06Q 20/4015; G06Q 20/1085; G06Q 20/3224; G06Q 20/4016;
 (Continued)

(56) References Cited

U.S. PATENT DOCUMENTS

| 8,458,095 | B2 | 6/2013 | Typrin et al. |
| 8,918,904 | B2 * | 12/2014 | Sanin ............. G06Q 50/01 |
| | | | 726/28 |

(Continued)

FOREIGN PATENT DOCUMENTS

| CN | 108053220 B | 7/2019 |
| IN | 201627030218 A | 10/2016 |
| WO | 2016098219 A1 | 6/2016 |

OTHER PUBLICATIONS

D. M. Shila, K. Srivastava, P. O'Neill, K. Reddy and V. Sritapan, "A multi-faceted approach to user authentication for mobile devices—Using human movement, usage, and location patterns," 2016 IEEE Symposium on Technologies for Homeland Security (HST), 2016, pp. 1-6, doi: 10.1109/THS.2016.7568944. (Year: 2016).*

(Continued)

*Primary Examiner* — Daniel S Felten
*Assistant Examiner* — Claire A Rutiser
(74) *Attorney, Agent, or Firm* — Shumaker & Sieffert, P.A.

(57) ABSTRACT

An example method includes receiving information related to a transaction with a financial account initiated by a customer at a financial terminal, the financial account including a transaction limit. Based on the information related to the transaction exceeding the transaction limit for the financial account, the method includes identifying a mobile device associated with the financial account and receiving location information of the mobile device via one or both of a passive location response or an active location response. Based on the location information of the mobile device, the method includes determining that the mobile device is located within a predetermined distance from a location of the financial terminal and temporarily changing the transaction limit for the financial account by a variable amount based on whether the location information of the (Continued)

mobile device was received via the one or both of the passive or the active location response.

20 Claims, 4 Drawing Sheets

(51) Int. Cl.
*G06Q 20/32* (2012.01)
*G06Q 40/02* (2012.01)
*G06Q 50/14* (2012.01)
*G01S 19/01* (2010.01)
*H04L 67/52* (2022.01)

(52) U.S. Cl.
CPC ......... *G06Q 20/32* (2013.01); *G06Q 20/3224* (2013.01); *G06Q 20/4015* (2020.05); *G06Q 20/4016* (2013.01); *G06Q 40/02* (2013.01); *G06Q 50/14* (2013.01); *H04L 67/52* (2022.05)

(58) Field of Classification Search
CPC ........ G06Q 40/02; G06Q 50/14; G01S 19/01; H04L 67/18
See application file for complete search history.

(56) References Cited

U.S. PATENT DOCUMENTS

| | | | |
|---|---|---|---|
| 9,171,306 B1* | 10/2015 | He | G06Q 20/405 |
| 9,875,478 B1 | 1/2018 | Tyler | |
| 10,303,869 B1* | 5/2019 | Duke | G06F 21/32 |
| 10,373,246 B1 | 8/2019 | Groenjes et al. | |
| 2009/0313156 A1 | 12/2009 | Herr | |
| 2011/0238573 A1* | 9/2011 | Varadarajan | G07F 19/20 |
| | | | 705/43 |
| 2012/0198328 A1* | 8/2012 | Kiley | G06F 16/9537 |
| | | | 715/234 |
| 2013/0005253 A1* | 1/2013 | Grigg | G06Q 20/1085 |
| | | | 455/41.1 |
| 2013/0124411 A1* | 5/2013 | Kobres | G07F 19/20 |
| | | | 705/43 |
| 2014/0067656 A1* | 3/2014 | Cohen Ganor | G06Q 20/384 |
| | | | 705/39 |
| 2014/0279490 A1* | 9/2014 | Calman | G06Q 20/40 |
| | | | 705/43 |
| 2015/0227727 A1* | 8/2015 | Grigg | H04W 12/63 |
| | | | 726/4 |
| 2016/0019537 A1* | 1/2016 | Raja | G06Q 20/385 |
| | | | 705/43 |
| 2016/0116604 A1* | 4/2016 | Zeraatkar | A61B 6/037 |
| | | | 250/362 |
| 2016/0117650 A1* | 4/2016 | Weidenmiller | G06Q 20/405 |
| | | | 705/44 |
| 2016/0125412 A1* | 5/2016 | Cannon | G06Q 20/4014 |
| | | | 705/44 |
| 2016/0283703 A1* | 9/2016 | Allyn | G06F 21/32 |
| 2016/0350758 A1* | 12/2016 | Zoldi | G06Q 10/04 |
| 2017/0091764 A1* | 3/2017 | Lloyd | G06Q 20/4015 |
| 2017/0116604 A1* | 4/2017 | Lacoss-Arnold | G06Q 20/3224 |
| 2018/0096351 A1* | 4/2018 | Dahn | G06Q 20/386 |
| 2019/0228410 A1* | 7/2019 | Patel | G06F 16/9535 |
| 2021/0012342 A1* | 1/2021 | Moorthyrajan | G06Q 20/4014 |
| 2021/0357940 A1* | 11/2021 | Benkreira | H04W 12/08 |
| 2021/0389854 A1* | 12/2021 | Rose | G06F 3/0484 |

OTHER PUBLICATIONS

K. Angulo and A. A. Ramirez M., "Generic Authorizer: Authorizer Generic Banking Operations," 2012 International Conference on Information Science and Applications, 2012, pp. 1-7, doi: 10.1109/ICISA.2012.6220975. (Year: 2012).*

Albahbooh et al., "A Mobile Phone Device as a Biometrics Authentication Method for an ATM Terminal", 2015 IEEE International Conference, retrieved on Jul. 8, 2020, 8 pp.

Khan et al., "SEPIA: Secure-PIN-Authentication-as-a-Service for ATM using Mobile and Wearable Devices", 2015 3rd IEEE International Conference. retrieved on Jul. 8, 2020, 10 pp.

* cited by examiner

COMPUTER-BASED SYSTEM FOR DETERMINING DYNAMIC FINANCIAL TRANSACTION PARAMETERS

TECHNICAL FIELD

The disclosure relates to computing devices executing software applications.

BACKGROUND

Currency limits on financial transactions may be used to limit the financial cost of fraud. For example, withdrawal limits at automated teller machines (ATMs) help to reduce the financial risk of fraudulent direct access to a bank customer's bank account. ATMs are intended to be a fast, convenient service providing direct access to a customer's account, which may present opportunity for fraud due to the lack of a human operator verifying the identity of the ATM user and the ATM user's positioning in a car with quick exit access to roads. However, transaction limits such as ATM withdrawal limits may reduce the convenience to the customer use the banking services.

SUMMARY

In general, this disclosure describes a computer-based system for determining dynamic financial transaction parameters for a financial transaction based on verification of a location of a mobile device associated with a customer's financial account related to the financial transaction. The computer-based system may be configured to receive information relating to a financial transaction with a financial account that is initiated by a customer at a financial terminal, e.g., an automatic teller machine (ATM), where the financial transaction includes a transaction amount greater than a predetermined transaction limit for the financial account. The computer-based system may be configured to identify a mobile device of the customer that is associated with the financial account related to the financial transaction. The computer-based system may further be configured to receive an indication that the mobile device is located within a predetermined distance from the financial terminal. In response to the indication, the computer-based system may be configured to temporarily change the transaction limit for the financial account in order to execute the financial transaction for the transaction amount. The amount of the change to the transaction limit may be based on how the location of the mobile device is determined (e.g., active and/or passive location checks and/or responses) and/or a customer- or account-based risk score.

For example, the computer-based system receives information related to a cash withdrawal from a bank account requested by a customer at an ATM where the requested cash withdrawal exceeds a daily withdrawal limit for the customer's bank account. The computer-based system then identifies a mobile device associated with the customer's bank account from which the cash withdrawal is being made. The computer-based system may send a push notification to a banking application executed by the mobile device. In some examples, the banking application may passively send the GPS coordinates of the mobile device to the computer-based system. In other examples, the mobile device may present a selection option to the customer to agree to send the location of the mobile device to the computer-based system and send the GPS coordinates of the mobile device based on the selection option. In either example, if the received GPS coordinates of the mobile device are proximate to a location of the ATM, e.g., within a predetermined distance, the computer-based system may temporarily increase the daily withdrawal limit for the customer's bank account such that the requested cash withdrawal may proceed. In some examples, if the GPS coordinates are received from the customer's mobile device through both the passive location response and the active location response, the computer-based system may increase the daily withdrawal limit for the customer's bank account by a larger amount than if the GPS coordinates were received through only one of the location responses.

In one example, this disclosure describes a method includes receiving, by a computing device of a financial institution, information related to a transaction with a financial account initiated by a customer at a financial terminal, the financial account including at least one transaction limit; based on the information related to the transaction exceeding the at least one transaction limit for the financial account, identifying, by the computing device, a mobile device associated with the financial account; receiving, by the computing device, location information of the mobile device associated with the financial account via one or both of a passive location response or an active location response; determining, by the computing device based on the location information of the mobile device, that the mobile device is located within a predetermined distance from a location of the financial terminal; and temporarily changing, by the computing device, the at least one transaction limit for the financial account by a variable amount based on whether the location information of the mobile device was received via the one or both of the passive location response or the active location response.

In another example, this disclosure describes a system includes a database including a plurality of financial accounts; a memory; and one or more processors in communication with the database and the memory, the one or more processors configured to: receive information related to a transaction with a financial account initiated by a customer at a financial terminal, the financial account including at least one transaction limit; based on the information related to the transaction exceeding the at least one transaction limit for the financial account, identify a mobile device associated with the financial account; receive location information of the mobile device associated with the financial account via one or both of a passive location response or an active location response; determine, based on the location information of the mobile device, that the mobile device is located within a predetermined distance from a location of the financial terminal; and temporarily change, the at least one transaction limit for the financial account by a variable amount based on whether the location information of the mobile device was received via the one or both or the passive location response or the active location response.

In another example, this disclosure describes a computer readable medium comprising instructions that when executed cause one or more processors to: receive, information related to a transaction with a financial account initiated by a customer at a financial terminal, the financial account including at least one transaction limit; based on the information related to the transaction exceeding the at least one transaction limit for the financial account, identify, a mobile device associated with the financial account; send a notification for presentation on the mobile device, the notification including a selection option used to receive approval from the customer to allow the mobile device to send the location information of the mobile device to the computing device; receive location information of the mobile device in response to the customer selecting the option; determine, based on the location information of the mobile device, that the mobile device is located within a predetermined distance from a location of the financial terminal; and temporarily increase the at least one transaction limit for the financial account.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
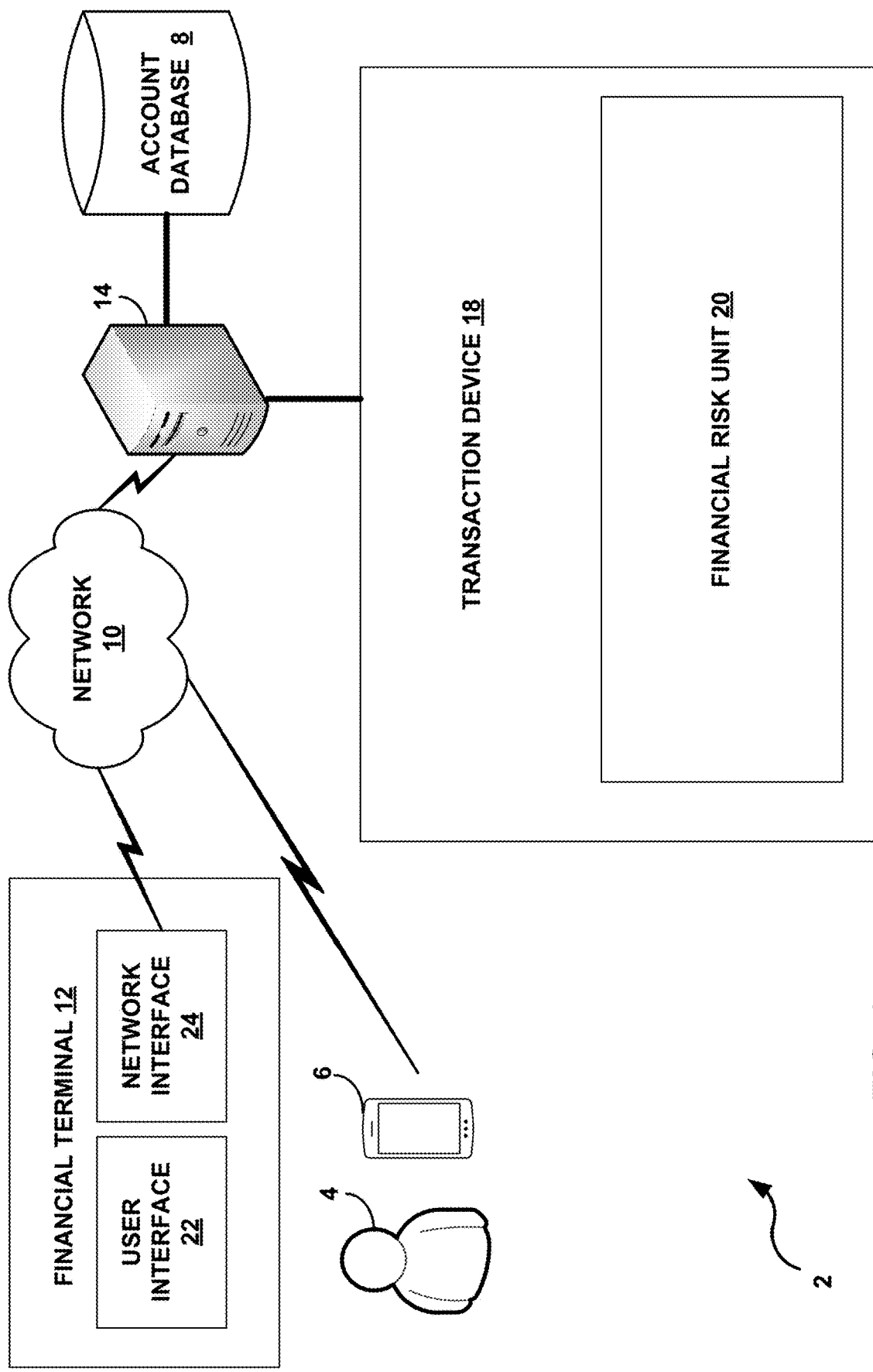
FIG. 1 is a block diagram illustrating an example computer-based system for determining dynamic financial transaction parameters, in accordance with the techniques of this disclosure.

The present disclosure relates to a computer-based system for determining dynamic financial transaction parameters for a financial transaction based on verification of a location of a mobile device associated with a customer's financial account related to the financial transaction. The computer-based system may be configured to receive information relating to a financial transaction with a financial account that is initiated by a customer at a financial terminal, e.g., an automatic teller machine (ATM), where the financial transaction includes a transaction amount greater than a predetermined transaction limit for the financial account. The computer-based system may be configured to identify a mobile device of the customer that is associated with the financial account related to the financial transaction. The computer-based system may further be configured to receive an indication that the mobile device is located within a predetermined distance from the financial terminal. In response to the indication, the computer-based system may be configured to temporarily change the transaction limit for the financial account in order to execute the financial transaction for the transaction amount. The amount of the change to the transaction limit may be based on how the location of the mobile device is determined (e.g., active and/or passive location responses) and/or a customer- or account-based risk score.

For example, the computer-based system receives information related to a cash withdrawal from a bank account requested by a customer at an ATM. The requested cash withdrawal may exceed a daily withdrawal limit for the customer's bank account. Typically, the customer would need to visit a bank branch or contact customer service in order to withdraw an amount of cash greater than the daily withdrawal limit. According to the present disclosure, the computer-based system may enable the customer to withdraw an amount of cash greater than the daily withdrawal limit, without having to visit a branch or call customer service, by implementing certain verification schemes associated with reducing the risk of fraudulent transactions, such as verifying that a mobile device associated with the customer's account is proximate to the ATM at the time of the withdrawal.

For example, the computer-based system may identify a mobile device associated with the customer's bank account from which the cash withdrawal is being made and send a request to a banking application executed by the mobile device. In some examples, the banking application may passively send the GPS coordinates of the mobile device to the computer-based system. In other examples, the request sent to the banking application executed by the mobile device may comprise a push notification such that the mobile device may present a selection option to the customer for approval prior to sending the location of the mobile device to the computer-based system, and the mobile device may send the GPS coordinates of the mobile device based on approval of the selection option. In either example, if the received GPS coordinates of the mobile device are proximate to a location of the ATM, e.g., within a predetermined distance, the computer-based system may temporarily increase the daily withdrawal limit for the customer's bank account such that the requested cash withdrawal may proceed. In some examples, if the GPS coordinates are received from the customer's mobile device through both the passive location response and the active location response, the computer-based system may increase the daily withdrawal limit for the customer's bank account by a larger amount than if the GPS coordinates were received through only one of the location responses.

FIG. 1 is a block diagram illustrating an example computer-based system 2 for determining dynamic financial transaction parameters, in accordance with the techniques of this disclosure. As illustrated in FIG. 1, system 2 includes a financial terminal 12 and a host server 14 that may communicate via network 10.

In some examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

In some examples, financial terminal 12 may be configured to output transaction information to, and receive transaction information from, customer 4 and network 10. For example, financial terminal 12 may be an ATM, and customer 4 may initiate a transaction via user interface 22. Network interface 24 of financial terminal 12 may be configured to send and receive transaction information related to the transaction initiated by customer 4 to host server 14, via network 10. For example, network interface 24 may comprise an Ethernet interface, optical transceiver, radio frequency (RF) transceiver, Wi-Fi or Bluetooth radio, telephony interface, or any other type of interface device capable of sending and receiving information to wirelessly communicate with external systems, such as host server 14 via network 10.

Host server 14 may be configured to process and/or execute the financial transaction based on the transaction information and other information, e.g., transaction-related information from transaction device 18, account database 8, or another bank system. Additionally, or alternatively, host server 14 may send and receive transaction information with one or more bank systems configured to process and/or execute the financial transaction. Although illustrated in FIG. 1 as a single device, in other examples host server 14 may comprise one or more computing devices implemented as any suitable computing system, such as one or more server computers, workstations, mainframes, appliances, cloud computing systems, and/or other computing systems that may be capable of performing operations and/or functions described in accordance with one or more aspects of the present disclosure.

Account database 8 may store account information that may be used to execute a financial transaction. In some examples, account database 8 may store account information, customer 4 profile data, customer 4 behavior data, historical transaction data, and the like. For example, account database 8 may store account information such as an account balance, and account number and routing number, the identification information of one or more account holders, e.g., customer 4, and any other suitable account information. In some examples, account database 8 may store customer 4 behavior data such as dates, times, and locations of one or more financial terminals, e.g., ATMs, that customer 4 has visited and/or performed financial transaction at, customer 4 historical travel information, customer 4 future travel plans, customer 4 web browsing history, and the like. In some examples, account database 8 may store historical transaction data such as, customer 4 purchase and/or shopping history, customer 4 credit/debit history, and the like. In some examples, account database 8 may store customer 4 future travel plans based on travel plans received from customer 4 and/or travel plans inferred and/or determined, e.g., by financial risk unit 20, based on customer 4 web browsing history, purchase/shopping history, credit/debit history, and the like.

In some examples, host server 14 may include and/or be configured to communicate with transaction device 18. Transaction device 18 may comprise a computing device configured to execute financial risk unit 20. Although illustrated in FIG. 1 as a single device, in other examples transaction device 18 may comprise one or more computing devices implemented as any suitable computing system, such as one or more server computers, workstations, mainframes, appliances, cloud computing systems, and/or other computing systems that may be capable of performing operations and/or functions described in accordance with one or more aspects of the present disclosure.

Transaction device 18 may be configured to process electronic transactions, e.g., transactions initiated by customer 4. For example, transaction device 18 may be configured to determine whether a transaction exceeds a transaction limit for a financial account associated with the transaction. Transaction device 18 may be configured to identify a mobile device 6 associated with the financial account associated with the transaction, and request and receive location information of the identified mobile device 6. In some examples, transaction device 18 is configured to determine that the mobile device 6 is located within a predetermined distance from a location of financial terminal 12 and to temporarily change the transaction limit for the financial account based on the determination that the mobile device 6 associate with the account is located within the predetermined distance from financial terminal 12, e.g., at or near the time of the occurrence of the transaction. In some examples, mobile device 6 may be any device capable of communicating via network 10, such as a mobile phone, a smartphone, a laptop computer, a wearable device configured to directly communicate with network 10 or pair with another device such as a smartphone, smart glasses and/or any smart device, and the like.

Financial risk unit 20 may be configured to determine financial risk associated with a financial transaction, e.g., a risk score associated with increasing and/or decreasing a transaction limit. In some examples, financial risk unit 20 may determine a risk score based on the location of the mobile device 6 associated with the account associated with the transaction. For example, financial risk unit 20 may be configured to determine a risk score based on whether the mobile device 6 is within a predetermined distance from financial terminal 12, e.g., at or near the time of the occurrence of the transaction. In some examples, financial risk unit 20 may be configured to determine a risk score based on alternative and/or additional information. For example, financial risk unit 20 may be configured to determine a risk score based on the distance of the mobile device 6 from financial terminal 12, customer 4 past history and transaction behavior, known customer 4 travel plans, the type of location determination of mobile device 6, e.g., passive versus active and/or GPS or other high accuracy location basis versus a lower accuracy location basis such as cell tower triangulation, mobile device 6 motion or lack thereof, an image of customer 4 captured via one or both of financial terminal 12 and mobile device 6 at or near the time of the transaction, image features included in the image of customer 4 such as background objects and/or landmarks, and the like.

In some examples, financial risk unit 20 may increase the transaction limit for the financial account for a limited time, e.g., for that day, based on the risk score. In some examples, financial risk unit 20 may change and/or increase the transaction limit for the financial account by a variable amount based on one or more of a type of location response used to determine that the mobile device is located within the predetermined distance from the location of the financial terminal, a transaction history of the financial account, or the travel plans of the customer 4. In some examples, financial risk unit 20 may decrease the transaction limit to an initial limit or default limit for the financial account after one of completion of the execution of the transaction or a predetermined amount of time.

Figure 2:
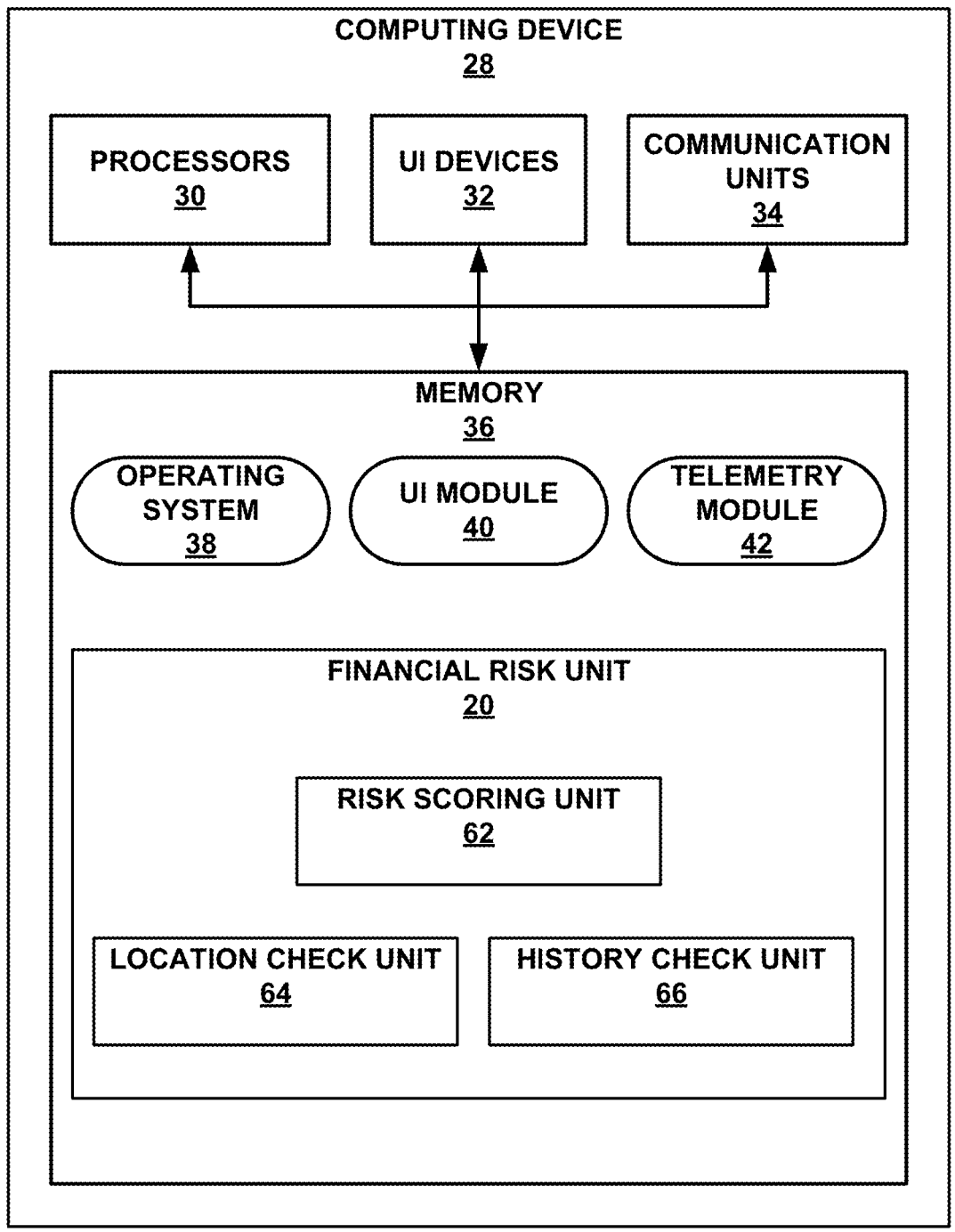
FIG. 2 is a block diagram illustrating an example computing device configured to change a financial transaction parameter, in accordance with the techniques of this disclosure.

FIG. 2 is a block diagram illustrating an example computing device 28 configured to execute financial risk unit 20, in accordance with the techniques of this disclosure. Computing device 28 may be an example of server 14 of FIG. 1 or transaction device 18 of FIG. 1, which may be included within or in communication with server 14. The architecture of computing device 28 illustrated in FIG. 2 is shown for exemplary purposes only and computing device 28 should not be limited to this architecture. In other examples, computing device 28 may be configured in a variety of ways.

As shown in the example of FIG. 2, computing device 28 includes one or more processors 30, one or more user interface (UI) devices 32, one or more communication units 34, and one or more memory units 36. Memory 36 of computing device 28 includes operating system 38, UI module 40, telemetry module 42, and electronic transaction repair unit 60, which are executable by processors 30. Each of the components, units or modules of computing device 28 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., electronic transaction repair unit 60) to temporarily store information during program execution.

Computing device 28 may utilize communication units 34 to communicate with external devices via one or more networks, e.g., network 10 from FIG. 1, or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as electronic transaction operator device 12, mobile device 6, and account database 8 from FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and financial risk unit 20 with processors 30, UI devices 32, communication units 34, and memory 36. UI module 40, telemetry module 42, and financial risk unit 20 may each include program instructions and/or data stored in memory 36 that are executable by processors 30. For example, financial risk unit 20 may include instructions that cause computing device 28 to perform one or more of the techniques described in this disclosure.

Computing device 28 may include additional components that, for clarity, are not shown in FIG. 2. For example, computing device 28 may include a battery to provide power to the components of computing device 28. Similarly, the components of computing device 28 shown in FIG. 2 may not be necessary in every example of computing device 28.

In the example illustrated in FIG. 2, financial risk unit 20 includes risk scoring unit 62, location check unit 64, and history check unit 68. In some examples, financial risk unit 20 may be configured to determine a risk that the transaction may be fraudulent, e.g., based on information from location check unit 64, history check unit 68, and/or risk scoring unit 62 and/or a risk score. Financial risk unit 20 may be configured to increase and/or decrease the transaction limit of the account based on the determined risk.

Risk scoring unit 62 may be configured to determine a customer- or account-based risk score. Risk scoring unit 62 may determine a risk score based on predetermined criteria and/or information related to customer 4 and/or the account associated with the transaction. For example, risk scoring unit 62 may determine a risk score based on information determined by location check unit 64 and/or history check unit 66.

In some examples, location check unit 64 may be configured to independently identify and/or confirm the identity of customer 4. For example, location check unit 64 may be configured to passively and/or actively determine the location of mobile device 6 associated with the account associated with the transaction. Location check unit 64 may be configured to passively determine the location of mobile device 6 by sending a location request to mobile device 6, e.g., via communication units 34 over network 10. Customer 4 may have previously agreed to allow mobile device 6 to respond with location information without notifying customer 4 of the request. Mobile device 6 may then send its location information to computing device 28.

Location check unit 64 may be configured to actively determine the location of mobile device 6 by sending a location request to mobile device 6, e.g., via communication units 34 over network 10, and mobile device 6 may notify customer 4 of the request and prompt customer 4 to allow or deny the location request. For example, mobile device 6 may be configured to open and/or execute an application, e.g., banking application 120 illustrated and described below with reference to FIG. 3, configured to notify customer 4 of the request and prompt customer 4 for an allow/deny response. In some examples, the location request may comprise a push notification via banking application 120 executed on mobile device 6. Customer 4 may then indicate, e.g., via touch screen, voice command, or any other suitable method, to allow the location request and mobile device 6 may then send its location information to computing device 28.

In some examples, risk scoring unit 62 may determine a score based on whether the location information was obtained passively or actively. For example, risk scoring unit may lower a risk score, e.g., meaning the transaction is less risky, if the location information is obtained actively. In some examples, financial risk unit 20 may be configured to increase (or decrease) the transaction limit associated with the financial account involved in the requested transaction by an amount that is greater for location information obtained actively versus passively, or by an amount that is greater for a risk score that is lower based on the location information being obtained actively versus passively.

In some examples, risk scoring unit 62 may determine a score based on whether the location information was obtained both passively and actively. For example, risk scoring unit may lower a risk score, e.g., meaning the transaction is less risky, if the location information is obtained both actively and passively. In some examples, financial risk unit 20 may be configured to increase (or decrease) the transaction limit associated with the financial account involved in the requested transaction by an amount that is greater for location information obtained both actively and passively versus either actively or passively, or by an amount that is greater for a risk score that is lower based on the location information being obtained both actively and passively versus actively or passively.

In some examples, location check unit 64 may be configured to determine the location resolution of the location information received from mobile device 6. For example, location check unit 64 may be configured to determine that the location information is GPS location information, which may be "high" resolution location information. High resolution location information may be location information that is accurate to within a first predetermined distance, e.g., to within a few centimeters, or to within one meter, or to within 10 meters, or the like. Low resolution location information may be location information that is accurate to within a second predetermined distance that is larger than the first predetermined distance. For example, low or "lower" resolution location information may be location information that is accurate to within 50 meters, 100, meters, 500 meter, one kilometer, and the like. For example, location check unit 64 may be configured to determine that the location information is based on the mobile device 6 signal strength received by a cell tower and/or cell tower triangulation of mobile device 6.

In some examples, location check unit 64 may be configured to utilize additional location information to determine how close mobile device 6 is to financial terminal 12. For example, mobile device 6 and financial terminal 12 may each be configured to communicate via NFC, Bluetooth, ultrasonic communication, and any other suitable short-range communication technique. Customer 4 may be prompted, e.g., by financial terminal 12 and/or an application executed by mobile device 6, to allow financial terminal 12 and mobile device 6 to communicate via one or more short-range communication techniques, e.g., a ping request via a short-range communication technique. Location check unit 64 may be configured to determine that the short-range communication was successful and may determine that mobile device 6 is within a predetermined distance from financial terminal 12 based on the successful short-range communication. In some examples, short-range communication between mobile device 6 and financial terminal 12 may be passive. For example, a location information request from computing device 28 may cause an application to run on mobile device 6, and the application may automatically search and/or ping financial terminal 12 via a short-range communication technique and output the results of the short-range communication to computing device 12 and location check unit 64.

In some examples, location check unit 64 may be configured to determine whether mobile device 6 is moving. For example, location check unit 64 may cause one or more location check requests to be sent to mobile device 6 and/or a request for location information for a period of time, or a request for location information history, or a request for accelerometer information or any other information suitable for determining the motion of mobile device 6.

In some examples, location check unit 64 may be configured to determine and/or confirm a location of mobile device 6 based on one or more images captured by mobile device 6. For example, in response to a location check request from location check unit 64, an application executing on mobile device 6 may prompt customer 4 to acquire an image. In some examples, the image may include customer 4 and one or more background features. In some examples, the one or more background features may include the financial terminal 12 and/or one or more other features known to be proximate to financial terminal 12. The application may further be configured to output the image to computing device 28, and location check unit 64 may be configured to extract and identify the one or more background features within the image. In some examples, location check unit 64 may be configured to identify customer 4 based on the image from mobile device 6. For example, location check unit 64 may be configured to identify customer 4 via facial recognition, determination of customer attributes such as age, gender, and the like, comparison of the image of customer 4 with a stored image of customer 4 associated with the financial account, or any other image processing technique suitable to identify customer 4 (or identify that customer 4 is not in the image). In some examples, financial risk unit 20 may be configured to increase (or decrease) the transaction limit associated with the financial account involved in the requested transaction based on the identification of the one or more background features (or lack thereof) in the image. Risk scoring unit 62 may be configured to decrease (or increase) the risk score based on the identification of the one or more background features (or lack thereof) in the image.

In some examples, location check unit 64 may be configured to determine and/or confirm a location of mobile device 6 based on one or more sounds and/or audio information. For example, mobile device 6 and/or financial terminal 12 may be configured to emit and record sound, e.g., via speakers and/or microphones. In some examples, location check unit 64 may be configured to cause financial terminal 12 to output live and/or recorded audio information to computing device 28. Location check unit 64 may be configured to identify customer 4 via voice detection using the audio information. In some examples, location check unit 64 may be configured to cause mobile device 6 to output live and/or recorded audio to computing device 28.

For example, an application executed by mobile device 6 may cause mobile device 6 to collect and output audio information in response to a location request initiated by location check unit 64. Location check unit 64 may be configured to identify the location of mobile device 6 based on the audio information. For example, location check unit 64 may be configured to identify sounds known to originate from audio sources located proximate to financial terminal 12. In some examples, one or both of financial terminal 12 and mobile device 6 may output and detect one or more sounds and/or audio signals, and location check unit 64 may be configured to determine that mobile device 6 is proximate to financial terminal 12 based on the detected sound and/or audio signal. In some examples, location check unit 64 may be configured to determine that mobile device 6 is located proximate to financial terminal 12 based on a comparison of audio signals detected by both financial terminal 12 and mobile device 6 at the same time, e.g., if both mobile device 6 and financial terminal 12 detect the same noises and/or sounds.

In some examples, location check unit 64 may be configured to determine an emotional and/or physical state of customer 4 based on audio information detected by mobile device 6 and/or financial terminal 12, e.g., stress, duress, and the like. Risk scoring unit 62 and financial risk unit 20 may be configured to increase a risk score and decrease the transaction limit, respectively, based on the determined emotional state, and vice versa. In some examples, financial risk unit 20 may be configured to increase (or decrease) the transaction limit associated with the financial account involved in the requested transaction based on the audio information. Risk scoring unit 62 may be configured to decrease (or increase) the risk score based on the audio information.

In some examples, location check unit 64 may be configured to determine and/or confirm a location of mobile device 6 based on events occurring at or near financial terminal 12 contemporaneously with the financial transaction request. For example, location check unit 64 may cause mobile device 6 and/or financial terminal 12 to record image or audio information, and location check unit 64 may be configured to process the image or audio information to determine whether the image or audio information includes expected image or audio information corresponding to one or more known events, e.g., a street fair, a concert, etc., known to be occurring proximate to financial terminal 12 and contemporaneously with the financial transaction request by customer 4. In some examples, location check unit 64 may be configured to determine recent crime and/or fraud at or proximate to financial terminal 12. In some examples, location check unit 64 may be configured to determine whether financial terminal 12 and/or a use history of financial terminal 12 by another title holder on the account associated with the financial transaction, e.g., a known relative and/or joint account holder. In some examples, location check unit 64 may be configured to determine location information of mobile device 6 based on proximity of mobile device 6 to another phone and/or device known to be owned by another titleholder of the account associated with the financial transaction. In some examples, location check unit 64 may determine that mobile device 6 is paired with earbuds, a wearable device, an automobile, and the like, owned by customer 6 and/or another titleholder of the account. Risk scoring unit 62 may be configured to decrease (or increase) the risk score based on the events occurring at or near financial terminal 12, e.g., the known events, recent crime/fraud, proximity of other devices of customer 6 and/or another titleholder of the account determined by location check unit 64.

In some examples, history check unit 66 may be configured to determine certain behaviors and inferred intent of customer 4 indicative of reduces and/or increased risk of a fraudulent transaction. For example, history check unit 66 may be configured to determine customer 4 travel plans, for which it would be expected that customer 4 initiate a transaction to get cash and/or move funds. In some examples, customer 4 may provide information related to travel plans to the organization or bank operating financial terminal 12. History check unit 66 may access the travel plans and determine that customer 4 is expected to be traveling. In some examples, history check unit 66 may infer travel plans of customer 4. For example, history check unit 66 may be configured to access shopping/purchase information for customer 4, e.g., customer 4 may "opt in" to sharing such information.

Additionally, and/or alternatively, history check unit 66 may be configured to access browsing and/or search activity of customer 4. History check unit 66 may be configured to determine that the shopping/purchasing/browsing/searching of customer 4 is associated with upcoming travel. For example, history check unit 66 may be configured to execute one or more machine learning, artificial intelligence, or other technique to infer customer 4 intent based on customer 4 shopping/purchasing/browsing/searching information, such as the intent to travel. In some examples, financial risk unit 20 may be configured to increase (or decrease) the transaction limit associated with the financial account involved in the requested transaction based on the known or inferred travel plans (or lack thereof, and risk scoring unit 62 may be configured to decrease (or increase) the risk score based on the known or inferred travel plans (or lack thereof).

In some examples, history check unit 66 may be configured to determine whether customer 4 is expected to use financial terminal 12. For example, history check unit 66 may be configured to receive information related to customer 4 past use of financial terminal 12 and/or other financial terminals and past customer 4 behavior regarding similar transactions (e.g., how customer 4 usually obtains cash, move funds, or pays for goods and services). History check unit 66 may be configured to receive information related to the current state of one or more accounts of customer 4. For example, history check unit 66 may receive information related to the account balance of the account involved in the requested transaction at financial terminal 12 and/or an amount of "cash-in-wallet" for one or more electronic wallet applications associated with one or more organizations, banks, retailers, and the like. In some examples, use of the same financial terminal 12 and/or a low cash-in-wallet balance may infer an expectation that customer 4 would be requesting the current transaction and may lower the risk of the transaction being fraudulent. In some examples, financial risk unit 20 may be configured to increase (or decrease) the transaction limit associated with the financial account involved in the requested transaction based on the expectation (or lack thereof) that customer 4 use financial terminal 12 for the requested transaction, and risk scoring unit 62 may be configured to decrease (or increase) the risk score based on the expectation (or lack thereof) that customer 4 use financial terminal 12 for the requested transaction.

Figure 3:
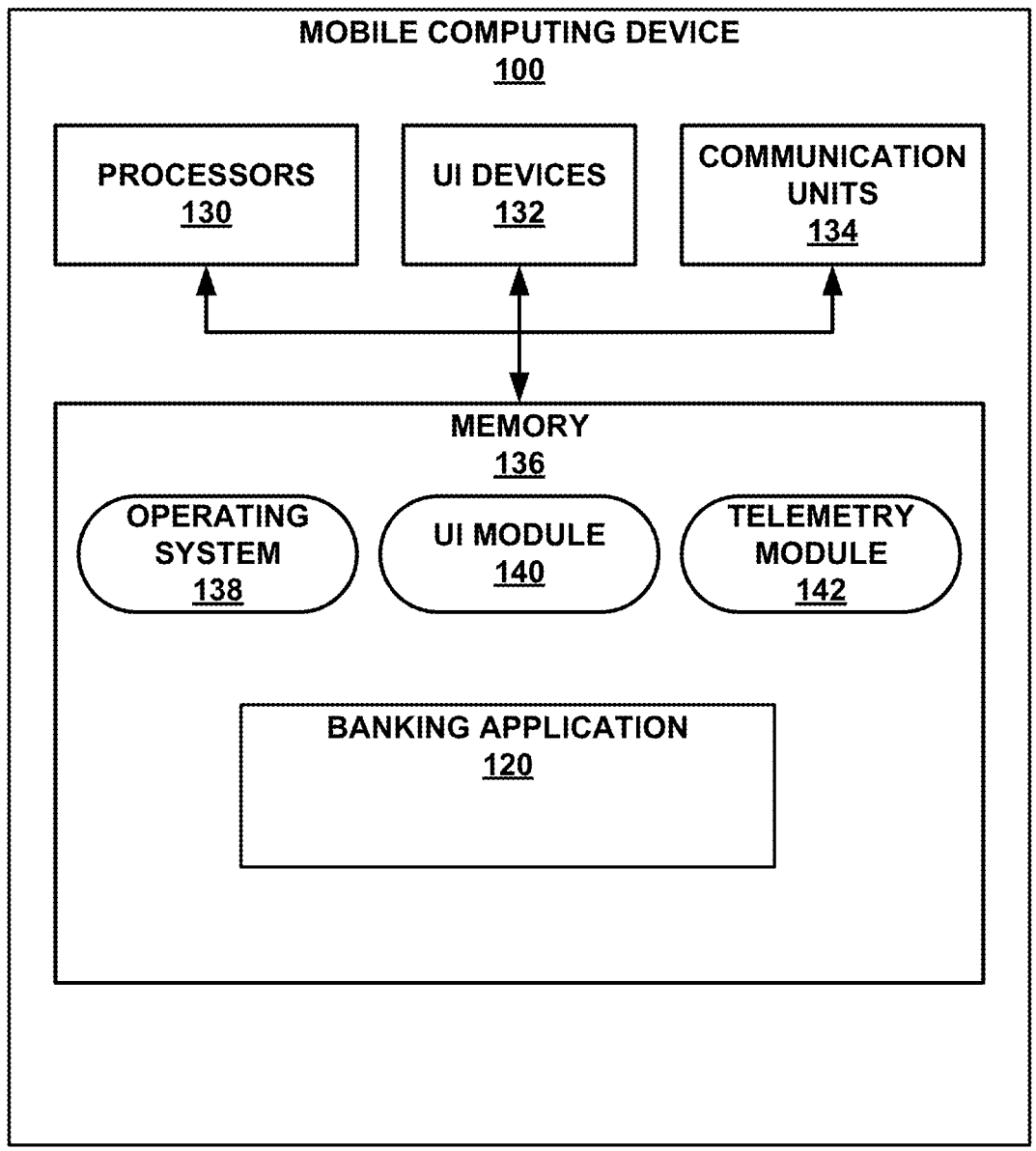
FIG. 3 illustrates a block diagram illustrating an example mobile device, in accordance with the techniques of this disclosure.

FIG. 3 is a block diagram illustrating an example mobile device 100, in accordance with the techniques of this disclosure. Mobile device 100 may be an example of mobile device 6 of FIG. 1, which may be in communication with server 14. The architecture of mobile device 100 illustrated in FIG. 3 is shown for exemplary purposes only and mobile device 100 should not be limited to this architecture. In other examples, mobile device 100 may be configured in a variety of ways.

As shown in the example of FIG. 3, mobile device 100 includes one or more processors 130, one or more UI devices 132, one or more communication units 134, and one or more memory units 136. Memory 136 of mobile device 100 includes operating system 138, UI module 140, telemetry module 142, and banking application 120, which are executable by processors 130. Each of the components, units or modules of mobile device 100 are coupled (physically, communicatively, and/or operatively) using communication channels for inter-component communications. In some examples, the communication channels may include a system bus, a network connection, an inter-process communication data structure, or any other method for communicating data.

Processors 130, in one example, may comprise one or more processors that are configured to implement functionality and/or process instructions for execution within mobile device 100. For example, processors 130 may be capable of processing instructions stored by memory 136. Processors 130 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 136 may be configured to store information within mobile device 100 during operation. Memory 136 may include a computer-readable storage medium or computer-readable storage device. In some examples, memory 136 include one or more of a short-term memory or a long-term memory. Memory 136 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 136 is used to store program instructions for execution by processors 130. Memory 136 may be used by software or applications running on mobile device 100 (e.g., banking application 120) to temporarily store information during program execution.

Mobile device 100 may utilize communication units 134 to communicate with external devices via one or more networks, e.g., network 10 from FIG. 1, or via wireless signals. Communication units 134 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, mobile device 100 utilizes communication units 134 to wirelessly communicate with an external device, such as electronic transaction operator device 12 of FIG. 1.

UI devices 132 may be configured to operate as both input devices and output devices. For example, UI devices 132 may be configured to receive tactile, audio, or visual input from a user of mobile device 100. In addition to receiving input from a user, UI devices 132 may be configured to provide output to a user using tactile, audio, or video stimuli. In one example, UI devices 132 may be configured to output content such as a GUI for display at a display device. UI devices 132 may include a presence-sensitive display that displays a GUI and receives input from a user using capacitive, inductive, and/or optical detection at or near the presence sensitive display.

Other examples of UI devices 132 include a touchscreen, mouse/touchpad/trackball, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 132 include a speaker, a cathode ray tube (CRT) monitor, a liquid crystal display (LCD), organic light emitting diode (OLED), or any other type of device that can generate intelligible output to a user.

Operating system 138 controls the operation of components of mobile device 100. For example, operating system 138, in one example, facilitates the communication of UI module 140, telemetry module 142, and banking application 120 with processors 130, UI devices 132, communication units 134, and memory 136. UI module 140, telemetry module 142, and banking application 120 may each include program instructions and/or data stored in memory 136 that are executable by processors 130. For example, banking application 120 may include instructions that cause mobile device 100 to perform one or more of the techniques described in this disclosure.

Mobile device 100 may include additional components that, for clarity, are not shown in FIG. 3. For example, mobile device 100 may include a battery to provide power to the components of mobile device 100. Similarly, the components of mobile device 100 shown in FIG. 3 may not be necessary in every example of mobile device 100.

Banking application 120 may be configured to send or output location information, such as GPS coordinates, to computing device 28. Banking application 120 may be configured to send and receive push notifications, e.g., with computing device 28 via network 10, for actively sending location information of mobile device 100. Banking application 120 may be configured to present selection options to, and to receive selections from, customer 4. For example, banking application 120 may be configured to present options to customer 4 for a one-time option to share location information valid for a period of time or until revoked, or to present options to customer 4 for sharing location information on a case-by-case basis, and to receive selected options from customer 4.

In some examples, banking application 120 may be configured to prompt customer 4 to allow financial terminal 12 and mobile device 100 to communicate via one or more short-range communication techniques, e.g., a ping request via a short-range communication technique, as described above. In some examples, banking application 120 may be configured to acquire an image and output the image to computing device 28, as described above. In some examples, banking application 120 may be configured process the image to identify/recognize customer 4 and/or one or more background features, similar to as described above with reference to location check unit 64, and to send the image processing results to computing device 28 with, or in lieu of, the image. Banking application 120 may be configured to include the cash-in-wallet banking feature and may be configured to receive a selection by customer 4 to share cash-in-wallet information, such as a balance, with computing device 28.

Figure 4:
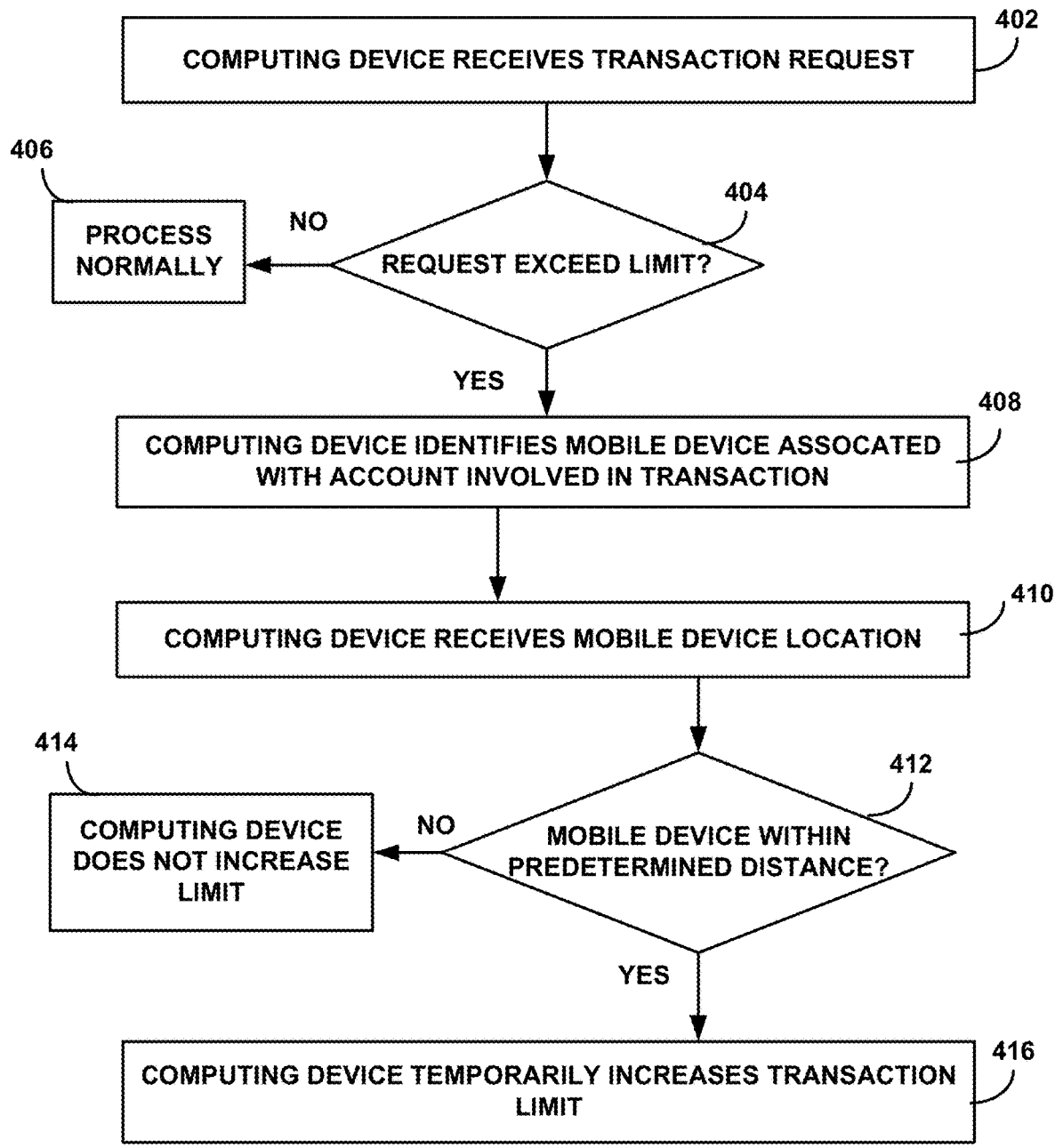
FIG. 4 is a flowchart illustrating an example method of determining dynamic financial transaction parameters, in accordance with the techniques of this disclosure.

FIG. 4 is a flowchart illustrating an example method 400 of determining dynamic financial transaction parameters, in accordance with the techniques of this disclosure. Although FIG. 4 is discussed using computer-based system 2 of FIG. 1, computing device 28 of FIG. 2, and mobile device 100 of FIG. 3, it is to be understood that the methods discussed herein may include and/or utilize other systems and methods in other examples.

Computing device 28 may receive a transaction request (402). If the transaction request does not exceed a current daily withdrawal limit associated with the account (the NO branch of 404), the transaction may proceed to execute normally (406). In some examples, computing device 28 may receive information related to a transaction, e.g., a transaction request for which a transaction amount exceeds a transaction limit (the YES branch of 404). For example, customer 4 may provide a bank card financial terminal 12, e.g., an ATM, and input a pin number authenticating access to a financial account linked to the bank card, and customer 4 may select or input a cash withdrawal. Computing device 28 may determine a transaction limit of the account based on account information stored in account database 8 and may determine that the cash withdrawal is greater than a current daily withdrawal limit associated with the account. Based on the information related to the transaction exceeding the transaction limit for the financial account, computing device 28 may identify a mobile device 100 associated with the financial account (408).

In some examples, computing device 28 may request a location of the mobile device associated with the account involved in the transaction initiated by customer 4, e.g., mobile device 6 or 100. In some examples, the location request may be a request for a passive location response, e.g., a response from mobile device 100 in which customer 4 is not required to be notified that mobile device 100 is sending location information to computing device 28. In some examples, the location request may be a request for an active location response, e.g., a response from mobile device 100 in which customer 4 is to be notified that mobile device 100 is sending location information to computing device 28 and, in some examples, requires a response from customer 4 to allow mobile device 100 to send the location information. In some examples, computing device 28 may send the request as a push notification to mobile device 100, e.g., as an active location response request. In some examples, the location request may be for both an active and a passive location response.

In some examples, mobile device 100 may display the request and/or push notification requesting location information. For example, banking application 120 executing on mobile device 100 may receive the location request/push notification and cause a user interface of mobile device 100 to display the location request/push notification and a selection option to approve or deny the request.

In some examples, customer 4 may not approve the request and select the deny option and the method 400 may end without increasing the transaction limit. In other examples, customer 4 may agree and select the agree option. In some examples, banking application 120 may cause mobile device 100 to display an option to agree to terms and conditions of sending location information and/or increasing or decreasing the transaction limit as a one-time agreement option for a specified time or until revoked, e.g., before the occurrence of the transaction request and one or all of the current method steps. Banking application 120 may then not display an option to agree to terms and conditions upon subsequent occurrences of location requests based on the one-time agreement. In other examples, banking application 120 may cause mobile device 100 to display an option to agree to terms and conditions of sending location information and/or increasing or decreasing the transaction limit as an option to agree for each occurrence of a request for mobile device 100 location information. In some examples, customer 4 may select to not agree, and the method 400 may end without increasing or decreasing the transaction limit. In other examples, customer 4 may agree, and method 400 may proceed to step 410.

In some examples, mobile device 100 may send location information as described above, such as GPS coordinates or location information based on cell tower information, to computing device 28 based on customer 4 selecting the option to agree to send location information and agreement with terms and conditions, e.g., an active location response. In some examples, mobile device 100 may send location information as described above, such as GPS coordinates or location information based on cell tower information, to computing device 28 without notification of customer 4, e.g., a passive location response.

Computing device 28 may receive the location information via one or both of a passive location response or an active location response (410). Computing device may determine whether mobile device 100 is within a predetermined distance from financial terminal 12 (412). For example, computing device 28 may determine and/or confirm the location of mobile device 100 based on the received location information, processing received image data or received processed image data, audio data, near-field communication data, customer 4 physical and/or emotional state, customer behavior data such as travel plans and past behavior, as described above with reference to risk scoring unit 62, location check unit 64, and history check unit 66 illustrated and described above. If computing device 28 determines that mobile device 100 is not within a predetermined distance from financial terminal 12 (the NO branch of 412), the method 400 may ends without an increase/decrease of the current daily withdrawal limit associated with the account (414). In some examples, computing device 28 may send further instructions and/or steps, or a notification, to mobile device 100 instructing customer 4 of how to increase the daily withdrawal limit and/or how to complete the amount of the transaction over the daily withdrawal limit, e.g., visit a branch.

If computing device 28 determines that mobile device 100 is within the predetermined distance from financial terminal 12 (the YES branch of 412), computing device 28 may temporarily increase (or decrease) the transaction limit (416). In some examples, computing device 28 may determine whether and how much to increase or decrease the transaction limit. For example, computing device 28 may temporarily increase (or decrease) the transaction limit by a variable amount based on whether the location information of the mobile device was received via one or both of the passive location response or the active location response. In some examples, computing device 28 may increase or decrease the transaction limit based on a risk score, e.g., as determined by risk scoring unit 62 as described above. For example, computing device 28 may execute (or be in communication with computing device 28 executing) financial risk unit 20 to determine whether and how much to increase or decrease the transaction limit.

In some examples, computing device 28 may increase (or decrease) the transaction limit by a variable amount based on a risk score for the transaction based at least on the determination that the mobile device is located within the predetermined distance from the location of the financial terminal. For example, computing device 28 may increase the transaction limit by a first amount based on the location response being active and a second amount based on the location response being passive, and the first amount may be greater than the second amount. In some examples, computing device 28 may increase the transaction limit by a first amount based on the location response being both active and passive, and a second amount based on the location response being either active or passive, and the first amount may be greater than the second amount. In some examples, computing device 28 may increase the transaction limit by a first amount based on a determination that customer 4 is expected or known to be travelling, and a second amount based a lack of known or expected customer 4 travel plans, and the first amount may be greater than the second amount. In some examples, computing device 28 may increase the transaction limit by a first amount based on a determination that customer 4 is expected to use that particular financial terminal 12 or to request the transaction in an amount greater than the current transaction limit, e.g., based on current or historical customer 4 behavior and/or account or transaction activity, and a second amount based a lack of expectation that customer 4 use that particular financial terminal 12 or request the transaction, and the first amount may be greater than the second amount.

Financial terminal 12 may complete the transaction including the increased (or decreased) transaction limit. For example, financial terminal 12 may dispense cash to customer 4 in an amount up to the increased transaction limit. In some examples, computing device 28 may decrease the transaction limit to the initial limit, e.g., the current or original transaction limit before customer 4 initiated the transaction, for the financial account after one of completion of the execution of the transaction or a predetermined amount of time has passed.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device of a financial institution, information related to a transaction with a financial account initiated by a customer at a financial terminal, the financial account including at least one transaction limit;
based on the information related to the transaction exceeding the at least one transaction limit for the financial account, identifying, by the computing device, a mobile device associated with the financial account;
receiving, by the computing device, location information of the mobile device associated with the financial account via one or both of a passive location response or an active location response from the mobile device, wherein the mobile device determines the location information via at least one of global positioning system (GPS), cell tower triangulation, or cell tower signal strength, and wherein receiving the location information via the active location response comprises receiving the location information from the mobile device based on approval of a customer notification to allow the mobile device to send the location information;
determining, by the computing device based on the location information of the mobile device, that the mobile device is located within a predetermined distance from a location of the financial terminal; and
temporarily changing, by the computing device, the at least one transaction limit for the financial account by a variable amount based on whether the location information of the mobile device was received via the one or both of the passive location response or the active location response, wherein temporarily changing the at least one transaction limit for the financial account comprises:
  temporarily increasing the at least one transaction limit by a first amount based on the location information of the mobile device being received via one of the passive location response or the active location response, and
  temporarily increasing the at least one transaction limit by a second amount based on the location information of the mobile device being received via both of the passive location response and the active location response, wherein the second amount is greater than the first amount.

2. The method of claim 1, wherein the financial terminal is an automated teller machine (ATM).

3. The method of claim 1, wherein the transaction with the financial account is a cash withdrawal.

4. The method of claim 1, wherein changing the at least one transaction limit for the financial account based on the determination comprises increasing a daily withdrawal limit for the financial account.

5. The method of claim 1, further comprising sending, via the computing device to the mobile device, a request for the mobile device to send location information of the mobile device to the computing device, wherein receiving location information via the passive location response comprises receiving, by the computing device from the mobile device, the location information of the mobile device in response to the request without sending the customer notification.

6. The method of claim 1, further comprising sending, via the computing device to the mobile device, a request for the mobile device to send location information of the mobile device to the computing device,
  wherein sending the request comprises sending, via the computing device, the customer notification for presentation on the mobile device, the customer notification including a selection option used to receive the approval from the customer to allow the mobile device to send the location information of the mobile device to the computing device,
  wherein receiving location information via the active location response comprises receiving, by the computing device from the mobile device, the location information of the mobile device in response to the customer selecting the option.

7. The method of claim 1, wherein temporarily increasing the at least one transaction limit for the financial account by the first amount comprises:
  temporarily increasing the transaction limit by a third amount based on the location information of the mobile device being received via the active location response, and
  temporarily increasing the transaction limit by a fourth amount based on the location information of the mobile device being received via the passive location response, wherein the third amount is greater than the fourth amount, and wherein the second amount is greater than each of the third amount or the fourth amount.

8. The method of claim 1, further comprising decreasing the transaction limit to an initial limit for the financial account after one of completion of the execution of the transaction or a predetermined amount of time.

9. The method of claim 1, wherein receiving the location information of the mobile device comprises receiving global positioning system (GPS) coordinates of the mobile device.

10. The method of claim 1, further comprising determining a risk score for the transaction based at least on the determination that the mobile device is located within the predetermined distance from the location of the financial terminal, wherein temporarily changing the at least one transaction limit for the financial account comprises temporarily increasing the at least one transaction limit by the variable amount based on the risk score for the transaction.

11. The method of claim 10, wherein determining the risk score for the transaction comprises:
  determining, by the computing device, whether the customer has used the financial terminal on one or more previous occasions;
  reducing the risk score, by the computing device, based on the determination that the customer has used the financial terminal on one or more previous occasions; and
  increasing the risk score, by the computing device, based on the determination that the customer has not used the financial terminal on one or more previous occasions.

12. The method of claim 10, wherein determining the risk score for the transaction comprises:
  determining, by the computing device, that the customer plans to travel in the immediate future;
  reducing the risk score, by the computing device, based on the determination that the customer plans to travel in the immediate future; and
  increasing the risk score, by the computing device, based on the determination that the customer does not plan to travel in the immediate future.

13. The method of claim 10, wherein temporarily changing the at least one transaction limit for the financial account comprises temporarily increasing the at least one transaction limit by the first amount for a first risk score and by the second amount for a second risk score, wherein the first risk score is greater than the second risk score.

14. The method of claim 1, wherein the transaction with the financial account is a cash withdrawal, the method further comprising:
  receiving, by the financial terminal, the temporarily increased at least one transaction limit for the financial account; and
  dispensing, by the financial terminal, cash to the customer in an amount up to the temporarily increased at least one transaction limit to complete the transaction with the financial account.

15. A system comprising:
  a database including a plurality of financial accounts;
  a memory; and
  one or more processors in communication with the database and the memory, the one or more processors configured to:
    receive information related to a transaction with a financial account initiated by a customer at a financial terminal, the financial account including at least one transaction limit;
    based on the information related to the transaction exceeding the at least one transaction limit for the financial account, identify a mobile device associated with the financial account;
    receive location information of the mobile device associated with the financial account via one or both of a passive location response or an active location response from the mobile device, wherein the mobile device determines the location information via at least one of global positioning system (GPS), cell tower triangulation, or cell tower signal strength, and wherein to receive the location information via the active location response the one or more processors are configured to receive the location information from the mobile device based on approval of a customer notification to allow the mobile device to send the location information;

determine, based on the location information of the mobile device, that the mobile device is located within a predetermined distance from a location of the financial terminal; and temporarily change, the at least one transaction limit for the financial account by a variable amount based on whether the location information of the mobile device was received via the one or both or the passive location response or the active location response, wherein to temporarily change the at least one transaction limit for the financial account the one or more processors are configured to:

temporarily increase the transaction limit by a first amount based on the location information of the mobile device being received via one of the passive location response or the active location response, and temporarily increase the transaction limit by a second amount based on the location information of the mobile device being received via both of the passive location response and the active location response, wherein the second amount is greater than the first amount.

16. The system of claim 15, wherein to temporarily change the at least one transaction limit for the financial account the one or more processors are configured to increase a daily withdrawal limit for the financial account.

17. The system of claim 15, wherein the one or more processors are further configured to:

send, to the mobile device, a request for the mobile device to send location information of the mobile device to the system, wherein to send the request the one or more processors are configured to send the customer notification for presentation on the mobile device, the customer notification including a selection option used to receive the approval from the customer to allow the mobile device to send the location information of the mobile device to the system, wherein receiving location information via the active location response comprises receiving, from the mobile device, the location information of the mobile device in response to the customer selecting the option.

18. The system of claim 15, wherein to temporarily increase the at least one transaction limited for the financial account by the first amount the one or more processors are further configured to:

temporarily increase the transaction limit by a third amount based on the location information of the mobile device being received via the active location response, and temporarily increase the transaction limit by a fourth amount based on the location information of the mobile device being received via the passive location response, wherein the third amount is greater than the fourth amount, and wherein the second amount is greater than each of the third amount or the fourth amount.

19. The system of claim 15, wherein the one or more processors are further configured to:

determine a risk score for the transaction based at least on the determination that the mobile device is located within the predetermined distance from the location of the financial terminal, wherein temporarily changing the at least one transaction limit for the financial account comprises temporarily increasing the at least one transaction limit by the variable amount based on the risk score for the transaction.

20. A non-transitory computer readable medium comprising instructions that when executed cause one or more processors to:

receive, information related to a transaction with a financial account initiated by a customer at a financial terminal, the financial account including at least one transaction limit;

based on the information related to the transaction exceeding the at least one transaction limit for the financial account, identify, a mobile device associated with the financial account;

receive location information of the mobile device associated with the financial account via one or both of a passive location response or an active location response from the mobile device, wherein the mobile device determines the location information via at least one of global positioning system (GPS), cell tower triangulation, or cell tower signal strength, and wherein to receive the location information via the active location response the instructions cause the one or more processors to receive the location information from the mobile device based on approval of a customer notification to allow the mobile device to send the location information;

determine, based on the location information of the mobile device, that the mobile device is located within a predetermined distance from a location of the financial terminal; and temporarily change the at least one transaction limit for the financial account by a variable amount based on whether the location information of the mobile device was received via the one or both of the passive location response or the active location response, wherein to temporarily change the at least one transaction limit for the financial account the instructions cause the one or more processors to:

temporarily increase the at least one transaction limit by a first amount based on the location information of the mobile device being received via one of the passive location response or the active location response, and temporarily increase the at least one transaction limit by a second amount based on the location information of the mobile device being received via both of the passive location response and the active location response, wherein the second amount is greater than the first amount.

* * * * *